United States Patent
Root

(10) Patent No.: US 9,401,996 B2
(45) Date of Patent: Jul. 26, 2016

(54) SYNCHRONIZING AUDIO SIGNAL SAMPLING IN A WIRELESS, DIGITAL AUDIO CONFERENCING SYSTEM

(71) Applicant: Timothy D Root, Nashua, NH (US)

(72) Inventor: Timothy D Root, Nashua, NH (US)

(73) Assignee: RevoLabs, Inc., Sudbury, MA (US)

(*) Notice: Subject to any disclaimer, the term of this patent is extended or adjusted under 35 U.S.C. 154(b) by 6 days.

(21) Appl. No.: 14/571,528

(22) Filed: Dec. 16, 2014

(65) Prior Publication Data
US 2015/0098559 A1  Apr. 9, 2015

Related U.S. Application Data

(63) Continuation of application No. 13/541,148, filed on Jul. 3, 2012, now Pat. No. 8,958,897.

(51) Int. Cl.
H04M 3/42 (2006.01)
H04M 3/56 (2006.01)
H04M 3/00 (2006.01)
H04M 9/08 (2006.01)
G10L 21/0208 (2013.01)

(52) U.S. Cl.
CPC ............ *H04M 3/568* (2013.01); *H04M 3/002* (2013.01); *H04M 3/567* (2013.01); *H04M 9/082* (2013.01); *G10L 2021/02082* (2013.01); *H04M 2203/509* (2013.01); *H04M 2250/62* (2013.01)

(58) Field of Classification Search
CPC ....... H04M 3/56; H04M 3/567; H04M 3/568; H04M 7/006; H04L 29/06027
See application file for complete search history.

(56) References Cited

U.S. PATENT DOCUMENTS

| | | | | |
|---|---|---|---|---|
| 5,315,596 A * | 5/1994 | Lee | ......... | H04J 3/1641 370/369 |
| 5,537,414 A * | 7/1996 | Takiyasu | ............... | H04J 3/1694 370/347 |
| 6,975,877 B1 * | 12/2005 | Dergun | ................. | H04J 3/0652 370/328 |
| 7,385,947 B2 * | 6/2008 | Wu | ........................ | H04W 88/08 370/328 |
| 7,498,958 B1 * | 3/2009 | Lee | .................... | H03H 17/0455 341/122 |
| 2002/0001299 A1 * | 1/2002 | Petch | .................... | H04J 3/0682 370/350 |
| 2003/0074637 A1 * | 4/2003 | Pavesi | ....................... | G06F 1/08 716/114 |
| 2006/0253746 A1 * | 11/2006 | Momtaz | ................ | H03L 7/0814 714/704 |
| 2007/0078000 A1 * | 4/2007 | Saund | ...................... | A63F 13/12 463/42 |
| 2007/0273502 A1 * | 11/2007 | Raphael | .................. | G01S 19/23 340/539.1 |
| 2008/0171569 A1 * | 7/2008 | Pralle | ....................... | H04B 1/74 455/525 |

* cited by examiner

Primary Examiner — Simon Sing
(74) Attorney, Agent, or Firm — Robert Schuler

(57) ABSTRACT

A digital audio conferencing system has a fixed base station that is in communication with a far end (R.E.) system over a communication network. The base station is associated with a wireless loudspeaker and one or more wireless microphones. The base station operates to receive F.E. audio signals to be played by the wireless loudspeaker, and it operates to remove acoustic echo picked up by the wireless microphones. A first clock controlling F.E. audio signal sampling at the base station, and a second clock controlling audio signal sampling and at a wireless microphone are synchronized to one master, reference clock that controls the operation of the base station. Acoustic echo included in an audio signal picked up by a wireless microphone is removed by AEC functionality running in the base station.

5 Claims, 7 Drawing Sheets

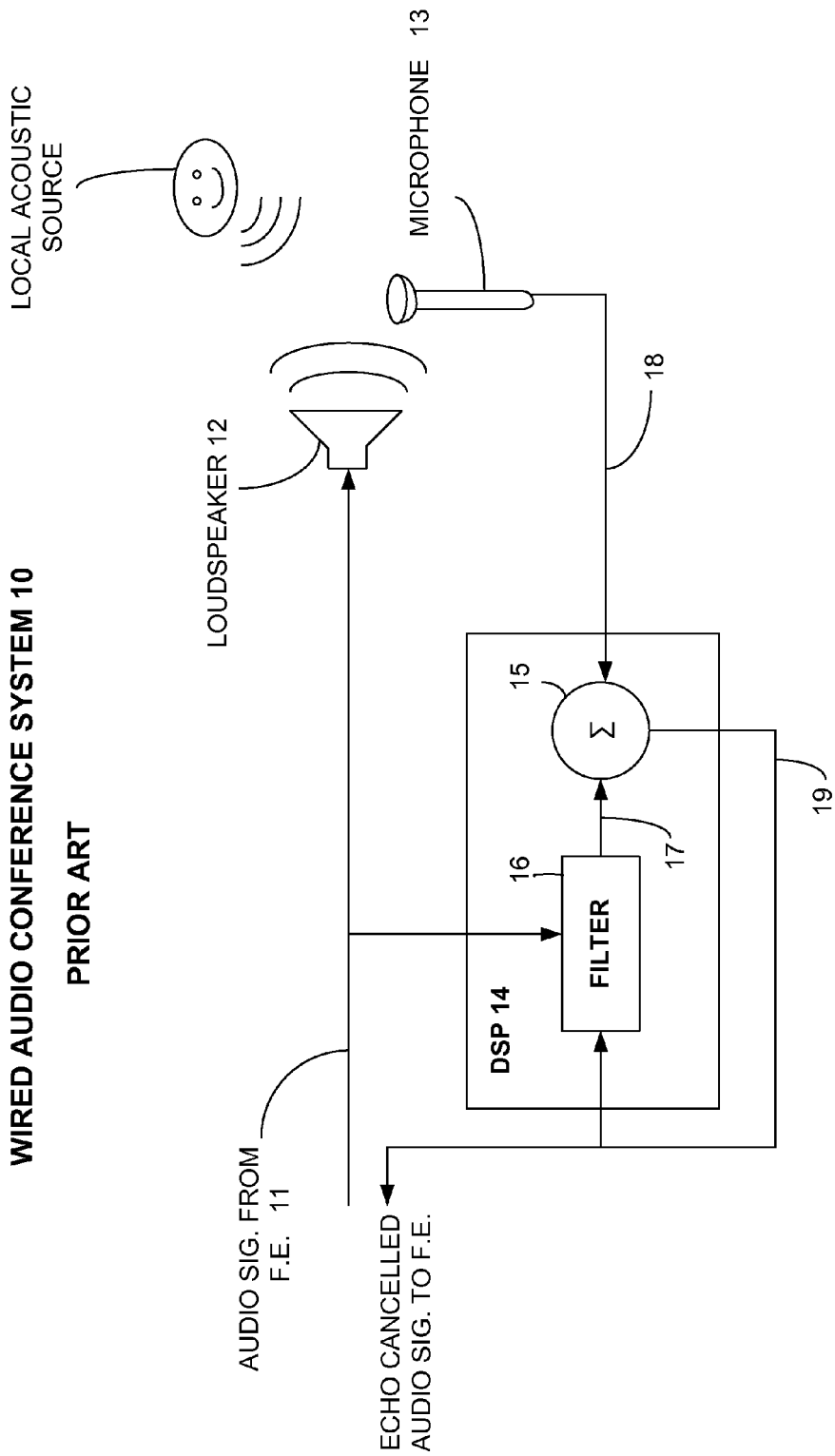

SYNCHRONIZING AUDIO SIGNAL SAMPLING IN A WIRELESS, DIGITAL AUDIO CONFERENCING SYSTEM

CROSS REFERENCE TO RELATED APPLICATIONS

This application is a continuing application filed under 37 CFR 1.53(b) and claims the benefit under 35 U.S.C. 120 of U.S. patent application Ser. No. 13/541,148, entitled "SYNCRONIZING AUDIO SIGNAL SAMPLING IN A WIRELESS DIGITAL AUDIO CONFERENCING SYSTEM", filed Jul. 3, 2012, the entire contents of which are incorporated herein by reference.

FIELD OF THE INVENTION

The present disclosure relates generally to audio conferencing systems having wireless microphones and wireless speakers.

BACKGROUND

Audio conferencing systems typically have a speaker, for playing audio generated by a far end audio signal source, and one or more microphones for capturing audio information generated by a near end or local audio signal source. As a consequence of the proximity of the speaker to one or more microphones in the system, at least some of the acoustic signal energy in the far end audio played by the speaker can be picked up by the microphones and sent back to the far end where it can be played and heard as acoustic echo. This acoustic echo can be very disruptive during the course of a conversation, as speakers at the far ends may have to wait for the echo to subside before speaking again.

In order to mitigate the disruptive effects of acoustic echo in an audio conferencing system, acoustic echo cancellation (AEC) arrangements exist that have the effect of removing a large portion of the acoustic echo component in the local microphone signal before it is sent to the far end. FIG. 1 shows a typical prior art audio conferencing system 10 having a loudspeaker 12 and a microphone 13 both of which are hard wired to the system. The system 10 also includes a digital signal processor (14) that includes, among other things, an adaptive filter 16 and a summation function 15. Generally, the audio conferencing system 10 operates as follows to cancel acoustic echo. An acoustic signal 11 generated by a far end (F.E.) audio source is received by the local audio conferencing system 10 (near end) which sends it to a loudspeaker 12 for reproduction. The far end acoustic signal is also sent to a DSP 14 that includes an adaptive filter 16 which is programmed to calculate an estimate of room echo (reference signal) 17. Typically, some energy from the acoustic signal 11 reproduced by the loudspeaker 12 is picked up by a microphone 13 (along with any local acoustic signal) and is sent to a summation function 15 operating in the DSP which subtracts the calculated estimate of the room echo (reference signal) 17 from a microphone signal 18 to product an echo cancelled signal 19 that is sent to the far end. This echo cancelled signal 19 is also sent to the DSP 14 which uses it to train the adaptive filter 16.

In order for the summation function to cancel the acoustic echo, both the reference signal and the microphone signal that includes the echo to be cancelled are processed by the summation function 15 at substantially the same time (aligned), otherwise some or all of the local room echo will not be cancelled. There is a round-trip delay from the time when the F.E. signal 11 is reproduced by the loudspeaker 12, the acoustic echo is picked up by the microphone (along with the local acoustic signal) and the acoustic signal 18 is sent to the DSP 14. This delay can be determined using empirical methods and can be programmed into the system 10 and is used to determine when in time the reference signal 17 is subtracted from the microphone signal 18.

As all of the signal processing typically takes place in a single DSP, DSP 14 in this case, the timing associated with the subtraction of the reference signal from the microphone signal cancelling the acoustic echo can be easily controlled. Specifically, since sampling of the F.E. acoustic signal 11 and the local microphone signal 18 takes place in a single device, DSP 14, the timing relationships between these signals are known.

DESCRIPTION OF THE RELATED ART

United States patent application publication no. 2004/0131201 entitled "Multiple Wireless Microphone Speakerphone System and Method" describes a speakerphone arrangement with wireless microphones that includes an analog audio speech processing unit 206 and that has a speaker 122 hard-wired to a speakerphone pod. Each wireless microphone 102a to 102n can transmit an audio signal over a separate frequency or during a separate timeslot to one of several receivers 1-N each of which is dedicated to a single wireless microphone. Associated with each receiver is a separate audio processing and AEC unit 114a to 114n which operate to remove acoustically coupled speaker signals from the microphone signals. While it is convenient to provide wireless microphones with a speakerphone system, prior art speakerphones with wireless microphones employ analog transmission techniques to send and receive the microphone signals, and such analog transmission techniques do not efficiently utilize the available wireless spectrum.

BRIEF DESCRIPTION OF THE DRAWINGS

FIG. 1 is a diagram of a wired audio conference phone.

DETAILED DESCRIPTION

Figure 2A:
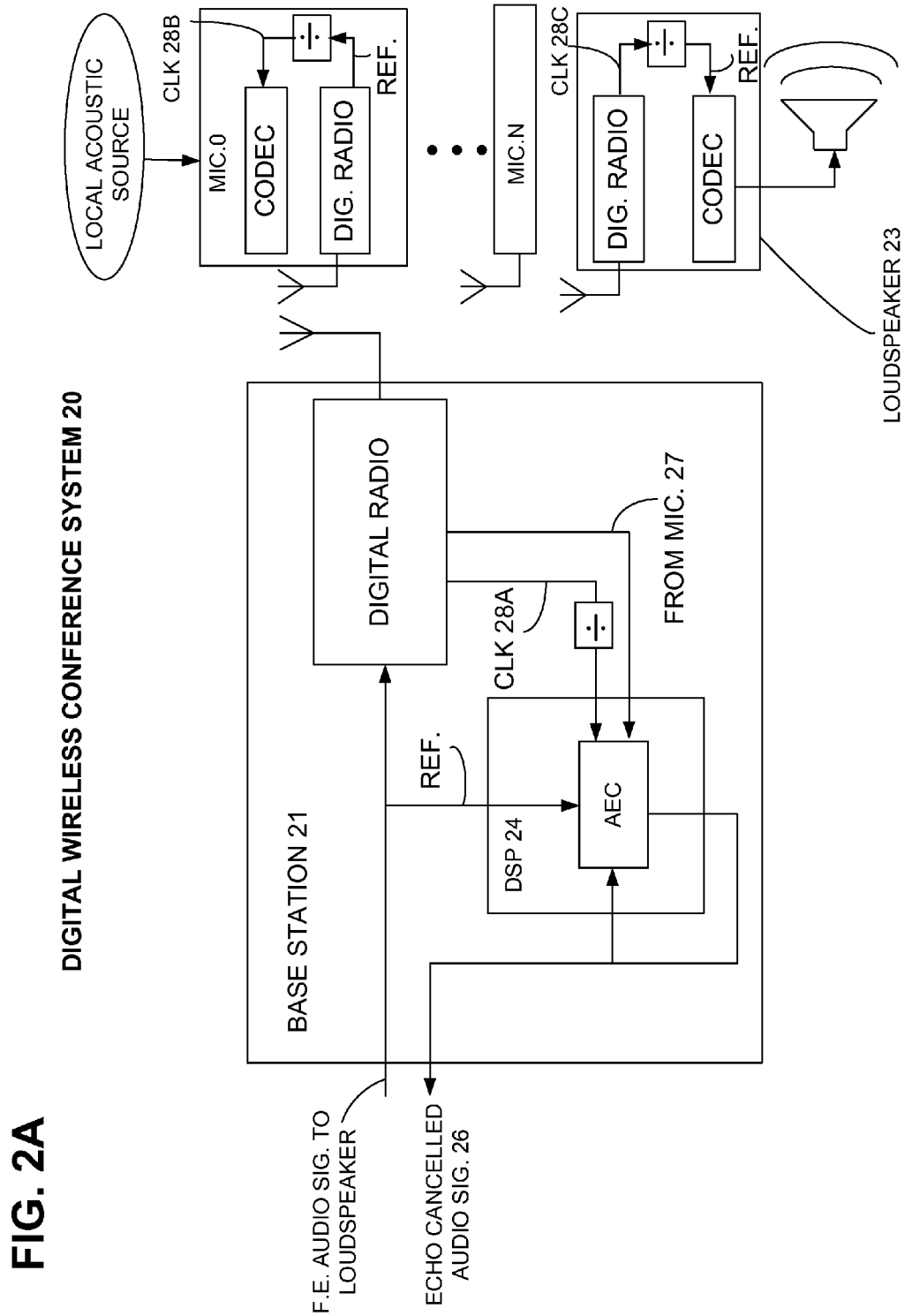
FIG. 2A is a diagram of an embodiment of a digital audio conference phone having wireless microphones and speakers.

Wireless digital communications protocols, such as DECT, and a variation referred to as Personal Wireless Communication (PWC), use an acoustic audio signal coding technique, such as the Constrained Energy Lapped Transform (CELT) or the Adaptive Differential Pulse Code Modulation (ADPCM) techniques, that permit the transmission of more information over a wireless medium in the same amount of time. Using either of these techniques to code an audio signal results in the compression of the audio signal without audible loss in audio fidelity or with an acceptable loss of audio fidelity. As a consequence of the advantages of digital, wireless communication protocols, many of the analog techniques for the wireless transmission of information are becoming obsolete. In this regard, an audio conferencing system having wireless microphones and a base station is designed such that the microphones and the base station transmit and receive acoustic audio information using a wireless digital communication protocol, such as the DECT protocol. Each of the microphones and the base station in the conferencing system have a transceiver device (radio) that operates to compress a digitized acoustic audio signal (or simply audio signal) for transmission or to decompress a received, compressed audio signal.

As with a wireless, analog audio conferencing system, it is necessary to remove acoustical echo received by each of the wireless microphones in a digital, wireless audio conferencing system. In order to remove acoustical echo from a signal before sending it to a far end system, it is necessary to sample and process an audio signal received from the F.E. system for reproduction by a local loudspeaker and it is necessary to sample and process a local microphone signal. The audio signal is sampled a first time by a first signal sampling device located in a base station (being driven by a first clock local to the base station) after it is received from a F.E. source, and it is sampled a second time (echo component) by a second signal sampling device located in a wireless microphone (being driven by a second clock local to the wireless microphone) after it is picked up by the wireless microphone. In order for the AEC to remove some or most of the echo component in the local microphone signal, the base station includes functionality that aligns the first audio signal samples and the second audio signal samples in time, and one hundred eighty degrees out of phase. However, if the first and second clocks driving the sampling functionality at the base station and at the wireless microphones respectively are not synchronized (due to differential clock drift between the first and second clocks, for instance) some of the audio information in the first audio sample can be different than the audio information in the second audio sample, and consequently it can be very difficult or not possible to align the audio information in time in order to perform the AEC operation.

It was discovered that the different clocks driving the sampling functionality at the base station and at the microphone can be derived from a single reference clock that drives the digital wireless transmission functionality (radio) in the base station. Since the base station (fixed part or F.P.) reference clock is the master clock to which each mobile device or mobile part (M.P.) radio reference clock slaves, all of the reference clocks in each part can be synchronized to the base station reference, and since each clock driving the sampling functionality at the F.P. and the M.P. is derived from a reference that is synchronized to the master reference, the base station is able to align in time audio information in the first audio signal samples relating to an echo estimate with corresponding acoustic echo information in the second audio signal samples to cancel the acoustic echo component included in the local microphone signal.

An embodiment of a digital conferencing system 20A is shown in FIG. 2A having a base station 21, a plurality of wireless microphones, MIC.0-MIC.n, and a plurality of wireless loudspeaker 23. The base station 21 can be referred to as a fixed part (F.P.) and each of the wireless microphones and the wireless loudspeaker can be referred to as a mobile part (M.P.) The base station or F.P. 21 is, in this case, connected over a link that is hard-wired to a communications network 22, such as a POTS network or an IP Internet Network, and generally operates to receive audio information from a far end (F.E.) audio source over the network 22, and it operates to transmit audio information picked up by any of the local microphones, MIC.0-MIC.n to the F.E. over the network 22. The base station 21 also operates to digitize and compress the audio information received from the F.E. and transmit a digitized, compressed audio signal over the air to the wireless loudspeaker 23, where the audio signal is decompressed and converted to an analog audio signal for reproduction by the loudspeaker. Each of the wireless microphones, MIC.0-MIC.n, operate to pickup acoustic audio information from a source, such as an individual speaker who is proximate to the microphone, convert the analog audio signal into a digital audio signal, compress the digitized audio signal and send the audio signal over a medium (in this case the air) to the base station 21 where the signal is decompressed.

Continuing to refer to FIG. 2A, in addition to digitizing and compressing the audio signal received from the F.E., the base station 21 also includes functionality that operates to remove/cancel acoustical echo from audio signals received from any of the microphones, MIC.0-MIC.n. This acoustical echo cancellation (AEC) functionality can be implemented in one or more digital signal processing (DSP) devices such as DSP 24 included in the base station 21. In operation, the AEC functionality comprising DSP 24 uses a F.E. audio signal and a local echo cancelled audio signal to calculate an estimate of an acoustical echo, and then remove this estimate of the acoustical echo from a local microphone signal before the conferencing system 20A sends the local audio signal over the network 22 to the F.E. More specifically the DSP 24 receives a F.E. audio signal 25 and an echo cancelled signal 26 as inputs which it uses to calculate an estimate of acoustical echo picked up by any one or more of the local microphones, MIC.0-MIC.n). The DSP 24 also receives an audio signal 27 from any one or more of the local microphones and subtracts the echo estimate from this microphone signal.

Also shown in FIG. 2A is a master reference clock 28A generated by the base station 21 digital radio, which is used to derive a sampling clock for the DSP 24. The reference clock 28A is the clock used to control the operating frequency (carrier frequency) of the radio transmissions to the wireless speaker with which the base station is associated. As can be seen in FIG. 2A, the reference clock 28A is divided down from a nominal carrier frequency to, in one embodiment, a 52 KHZ clock rate. The DSP 24 then uses this 52 KHZ clock to control the rate at which it samples the F.E. audio signal input to the DSP and which is typically referred to as a reference signal. Similar to the base station, each of the digital radio's comprising the local wireless microphones, MIC.0-MIC.n, in FIG. 2A and the wireless speaker also generate a reference clock (28B and 28C respectively) that is synchronized to the master reference clock in the base station 21. This reference clock generated by the radio in each microphone is divided from the nominal carrier frequency to a frequency that can be used to sample an acoustical audio signal received at each of the microphones, which in this case is the same clock rate, 52 HKZ, as used by the DSP 24 in the base station. As will be described in greater detail later with reference to FIG. 5, synchronizing the clocks that are used to control the sampling in the base station and in the microphones ensures that the audio information captured at each location can be aligned during the AEC process.

Figure 2B:
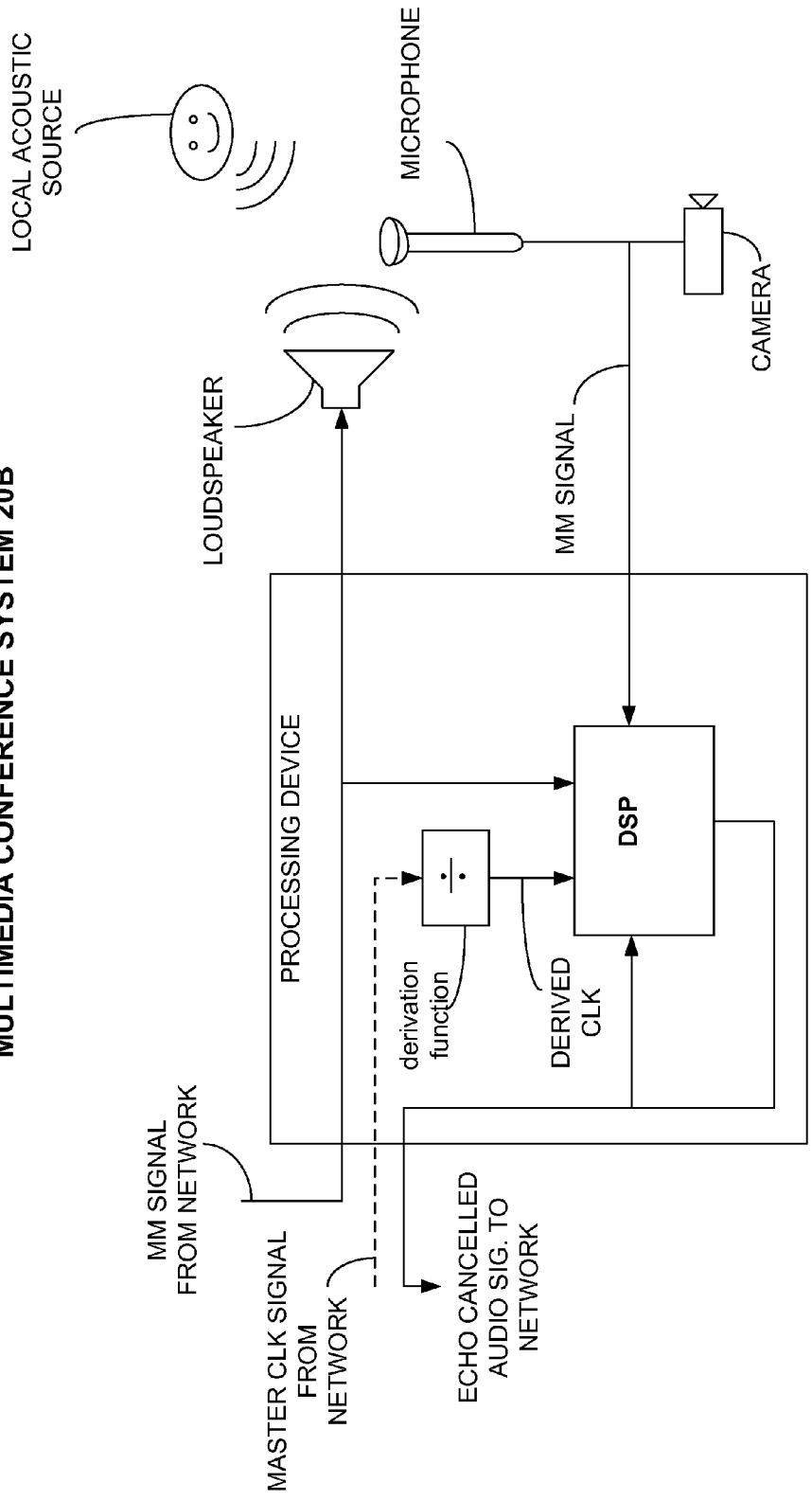
FIG. 2B is a diagram of an embodiment of a multimedia conference system.

In another embodiment, a multimedia conferencing system 20B is connected to a network, such as an internetwork or a local network, and receives and/or transmits multimedia information from and/or to another multimedia conferencing system also connect to the network. The multimedia (MM) conferencing system 20B is very similar to the digital wireless conference system 20A described with reference to FIG. 2A, with the primary difference being that the microphones and speakers are hard-wired to the system as opposed to communicating with a base station over a wireless medium. According to the embodiment of FIG. 2B, the conference system 20B is comprised of a processing device, at least one loudspeaker, one or more microphones and at least one camera all of which can be hard-wired to the processing device. The processing device is comprised of a digital signal processor (DSPO which is programmed to, among other things, run an audio application which operates to remove acoustical echo from a local signal that is sent back over the network to another, far end, MM system. The system 20B can receive a MM signal, which can have an audio and a video component, over the network from another MM system (or non-MM system, such as an audio conferencing system) connected to the network, and it can receive a network master clock signal from the network. The network master clock signal can be generated by a master clock generation device that is running external to the network (and connected to the network) or which is running internal to the network. The method for distributing the master clock signal throughout the network will not be described here as technique for such distribution are well know. The master clock signal is used by the network to drive the operation of certain equipment connected to the network, such as the MM conferencing device 20B, or any other device that can operate under the control of the network master clock. The MM signal received by the system 20B is sent to a loudspeaker connected to the system and it is sent to a DSP which is programmed to, among other things, remove acoustic echo from the local audio signal sent over the network to another MM system. The master clock signal received by the system 20B is sent to a clock derivation function comprising the processing device which operates to derive a local clock that the can be employed by the DSP to drive functionality associated with an echo cancellation application operating in the DSP. In this case, the clock derivation functionality modifies (divides) the a master clock rate to be a clock rate that a local clock can use to drive the audio processing application running on the processing device. While the clock derivation function described above operates to divide the master clock rate down to a rate used by the local clock, it should be understood that the master clock rate can be multiplied to increase the clock rate, or some other more complex derivation function can be used to derive the local clock rate.

Figure 3:
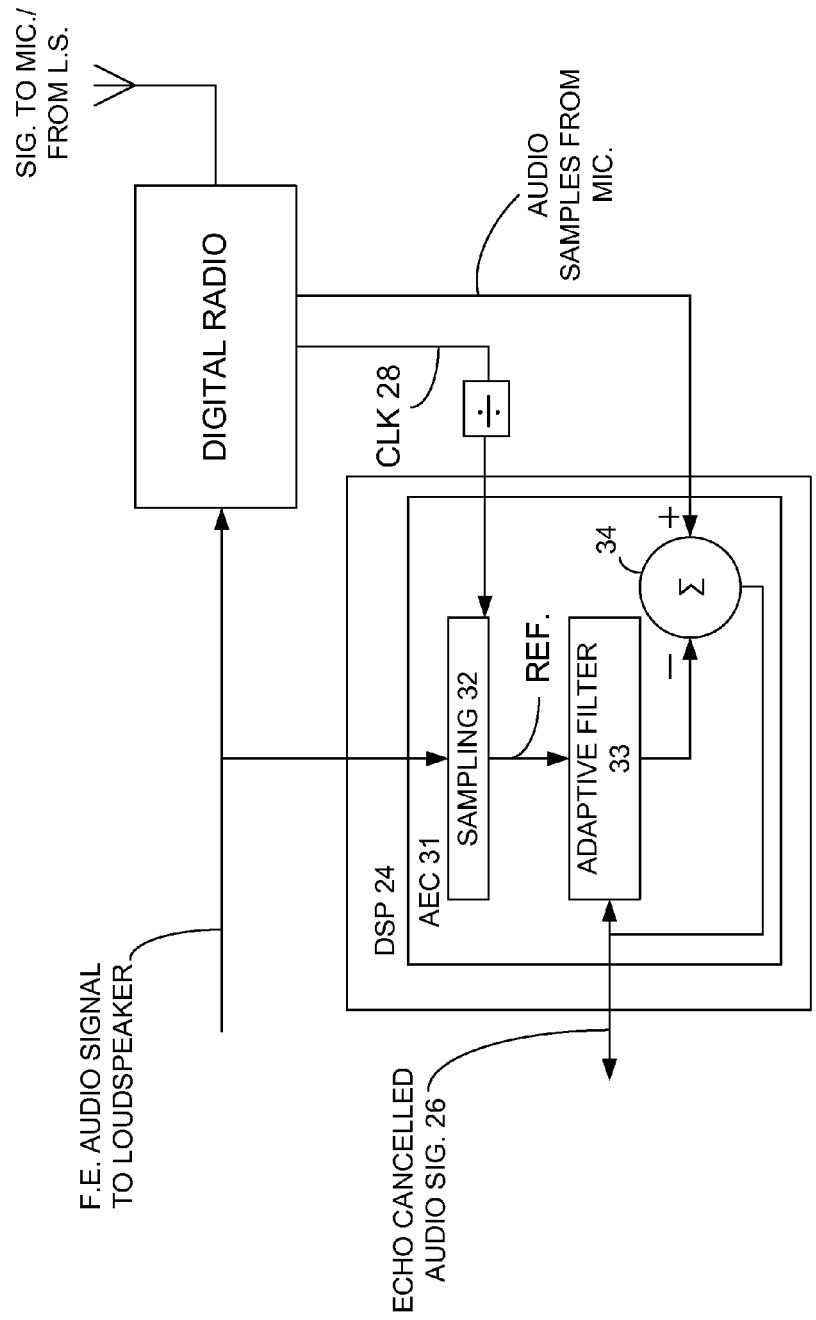
FIG. 3 is a diagram showing an audio conferencing system base station.

FIG. 3 is a diagram showing the base station 21 having AEC functionality 31 and a digital radio. The AEC 31 can be implemented in the DSP 24 of FIG. 2, and the operation of the AEC 31 is generally well known to audio engineers and so will not be described here in great detail. As shown in FIG. 3, the AEC 31 receives and samples at sampling functionality 32 an audio signal received from a F.E. source. The sampled signal is used as a reference signal at the input to an adaptive filter 33. The audio information comprising the reference signal and an echo cancelled signal is used by the adaptive filter 33 to calculate an estimate of acoustical echo picked up by any one of the local microphones, MIC.0-MIC.n. This estimate of acoustical echo is subtracted from a local microphone signal by a summation function 34, the result of which is an echo cancelled audio signal 36 which is sent to both the F.E. and applied to the adaptive filter 33 as discussed above. Note that in the embodiment of FIG. 3, the clock used to control the sample rate is derived from the master clock generated by the radio in the base station.

Figure 4:
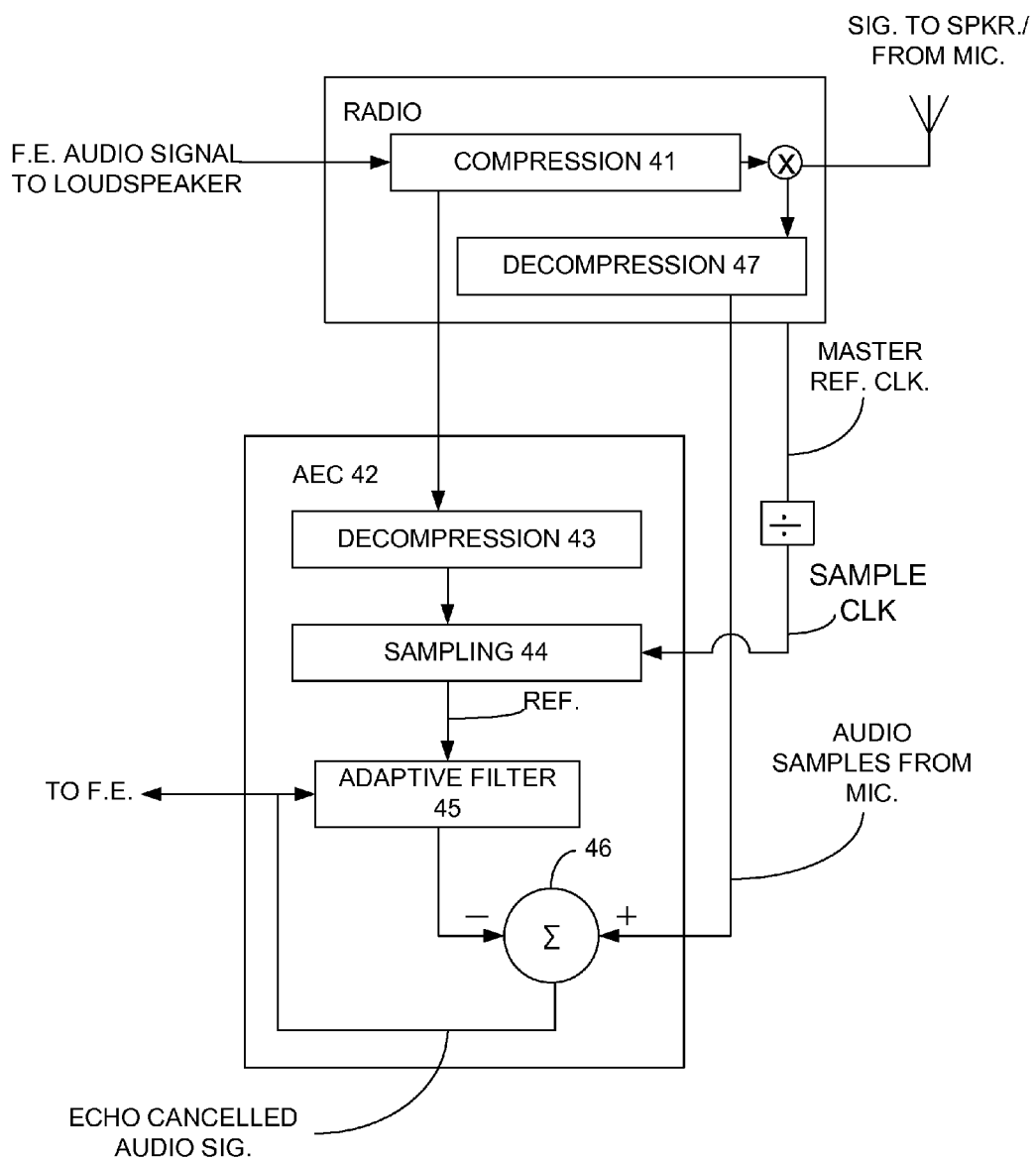
FIG. 4 is the base station FIG. 3 in greater detail.

FIG. 4 is a diagram illustrating much of the same functionality described with reference to FIG. 3, however in this Figure the F.E. audio signal used as input to a AEC 42 sampling function 44 is first compressed in the Radio. As described earlier, the coding technique currently employed by DECT devices is the adaptive differential pulse code modulation (ADPCM) technique (or alternatively CELT), and using this technique to code an audio signal results in the compression/decompression of the audio signal with audible loss in audio fidelity. Specifically, a F.E. audio signal received at the base station 40 is compressed for transmission over the medium to a wireless speaker, such as the wireless speaker 23 in FIG. 2. The audio signal received by the speaker 23 is then decompressed and played. Some of the acoustic signal played by the loudspeaker can be picked up by a local microphone where it is compressed and transmitted to the base station and decompressed. While the fidelity of the audio signal is not appreciably denigrated by the cycle of compression and decompression, audio signal information is lost as the result of this compression/decompression cycle which can make it difficult for the AEC 42 to converge to effectively cancel acoustic echo (because the reference signal includes different audio information than the microphone signal). In order to compensate for the microphone signal compression, a decompression function 43 is included in the AEC 42 that compensates for the loss of audio signal information resulting from the decompression of the speaker signal. The compensation method is described in detail in PCT/US2012/026147 the contents of which have been incorporated by reference in this description.

In operation, the radio in base station 40 receives an audio signal from a F.E. audio source and compresses the audio signal for transmission to a wireless speaker. The compressed F.E. audio signal is also sent to the AEC 42, where is it first decompressed by the decompression function 43 and then sampled by sampling function 44. The decompressed and sampled audio signal is used as a reference signal at the input to an adaptive filter 45 which operates to calculate, using an echo cancelled audio signal from a summation function 46, an estimate of an acoustical echo. This acoustical echo estimate is one input to the summation function 46, and a local microphone signal is a second input to the summation function. The summation function then subtracts the estimated echo from the local microphone signal and the base station sends the local microphone signal to the F.E. with the echo removed. More specifically, a local microphone, such as the wireless microphone MIC.0, receives acoustic audio information from one or more local acoustical sources, such as a speaker and a loudspeaker. The component of the acoustic audio picked up from the loudspeaker is the acoustic echo component to be cancelled. The local microphone signal is then compressed, by a digital radio, for transmission to the base station where the signal is decompressed and sent to the AEC 42. As with the base station 21 described with reference to FIG. 3, the sampling functionality 44 is controlled by a clock that is derived from the master reference clock generated by the digital radio.

Figure 5:
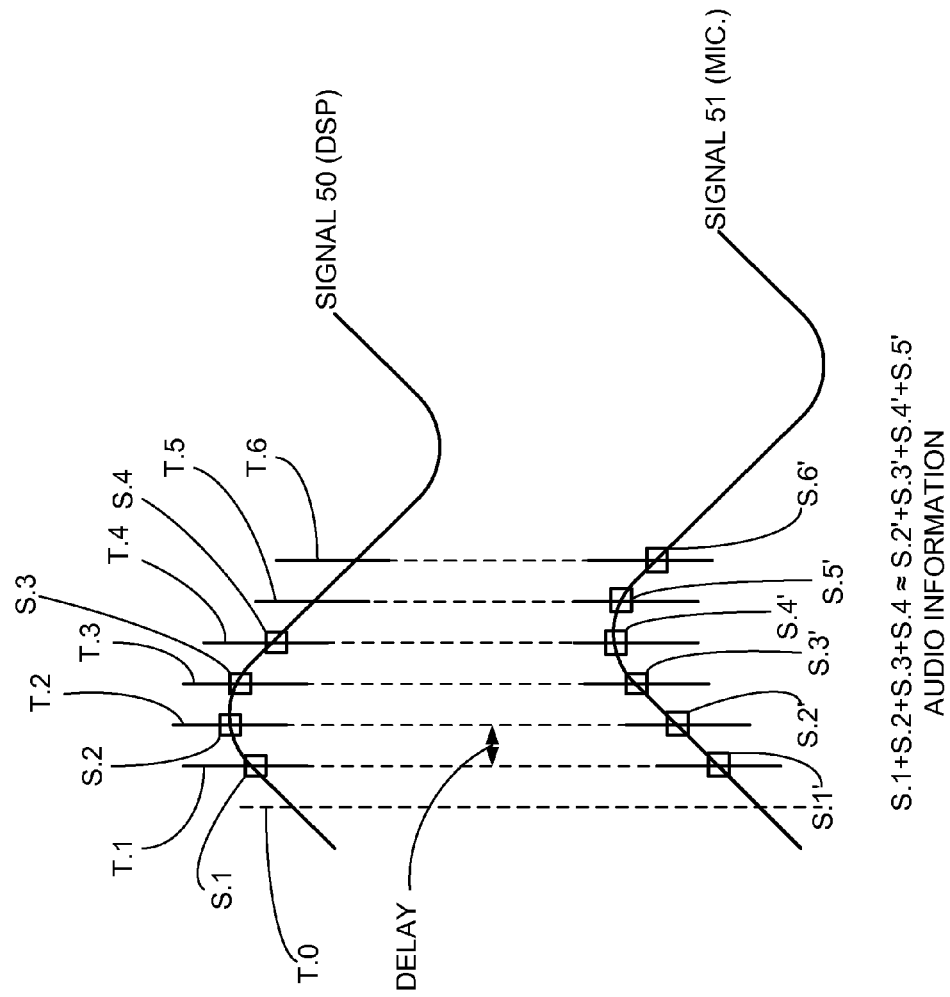
FIG. 5 is an illustration of a waveform sampled at a DSP and at a wireless microphone with synchronized sampling clocks.

As mentioned earlier with reference to FIG. 2, synchronizing the clock that is used to control the sampling at the base station of a F.E. audio signal destined for a wireless speaker, with each of the clocks used to sample an acoustic signal at the local microphones ensures that the audio information captured at each location can be aligned by AEC 42, which results in the maximum cancellation of acoustic echo. FIG. 5 illustrates how synchronizing the clock controlling the sampling of audio information at the DSP with each clock controlling the sampling of audio information at the wireless microphones permits corresponding or aligned DSP and the microphone samples to include similar audio information which allows the AEC 42 to align the sampled audio information in order to cancel any acoustic echo component included in a microphone signal. The term "similar", according to this description, means that the acoustic signal played by the wireless loudspeaker is modified according to the acoustical properties of the room in which the conferencing system is operating before being picked up by a microphone, so the audio signal/information picked up by the microphone is not exactly the same as the audio signal/information played by the loudspeaker, but the signal played by the loudspeaker in modified form. FIG. 5 shows an audio signal 50 received from a F.E. source destined for a wireless speaker, such as loudspeaker 23 in FIG. 2, and an audio signal 51 picked up by any one of the microphones, MIC.0-MIC.n in FIG. 2. Although the microphones pick up local audio information that is comprised of acoustic audio information generated by a local source, such as a speaker, and acoustic audio information from loudspeaker 23, for the purpose of this description the audio signal 51 only represents a waveform that includes the acoustic echo component picked up by the microphone from the loudspeaker 23. A first sample (S.1) of the audio information (audio information A) comprising signal 50 is captured on a first clock edge at time T.1, a second sample (S.2) of audio information comprising signal 50 is captured at time T.2, a third sample (S.3) is captured at time T.3 and a forth sample (S.4) is captured at time T.4. and so forth. Each of the samples includes a plurality of bits (8, 10, 12 or more) which together can represent a characteristic of the audio signal 50, such as amplitude, at the point in time the sample is captured. The position in time of the clock edges used by the DSP to start the capture each sample is controlled by a sampling clock which in one embodiment is derived from and synchronized to the master reference clock generated by the radio on the base station 21.

Continuing to refer to FIG. 5, the acoustic audio signal 51 picked up by one of the local microphones is sampled at the microphone as follows. A first sample of audio information (S.1') comprising signal 51 is captured on a first clock edge at time T.1, a second sample of audio information (S.2') is captured on a second clock edge at time T.2, a third sample of audio information (S.3') is captured on a third clock edge at time T.3, a forth sample of audio information is captured on a forth clock edge at time T.4 and a fifth sample of audio information is captured on a fifth clock edge at time T.5, and so forth. Each of the samples includes a plurality of bits which together represent a value indicative of the audio information captured from the signal 51. The position in time of the clock edges used by the sampling function on the microphone to start the capture of audio information associated with each sample is controlled by the sampling clock derived from and synchronized to, as described earlier with reference to FIG. 2, the master reference clock generated by the radio on the base station 21.

An examination of the two audio signals 50 and 51 in FIG. 5 shows that there is a time delay of one sampling clock cycle from the time the audio information captured in sample S.1 is picked up and captured in sample S.2' by the microphone. The exact value of this delay can be determined empirically and programmed into the AEC functionality of DSP 24. Knowing the value of this delay, the DSP 24 (more specifically, the AEC 42 in FIG. 4) can operate to align the audio information captured from the loudspeaker signal 50 with the audio information captured from the microphone signal 51. More specifically, it can be seen in FIG. 5 that the audio information captured in sample S.1 in signal 50 starting at time T.1 corresponds to the audio information captured in sample S.2' in signal 51 starting at time T.2. In this case the signal propagation delay is one sampling clock cycle (but the delay can be more or less than one cycle), and this delay can be programmed into the AEC functionality 42 as described above.

Figure 6:
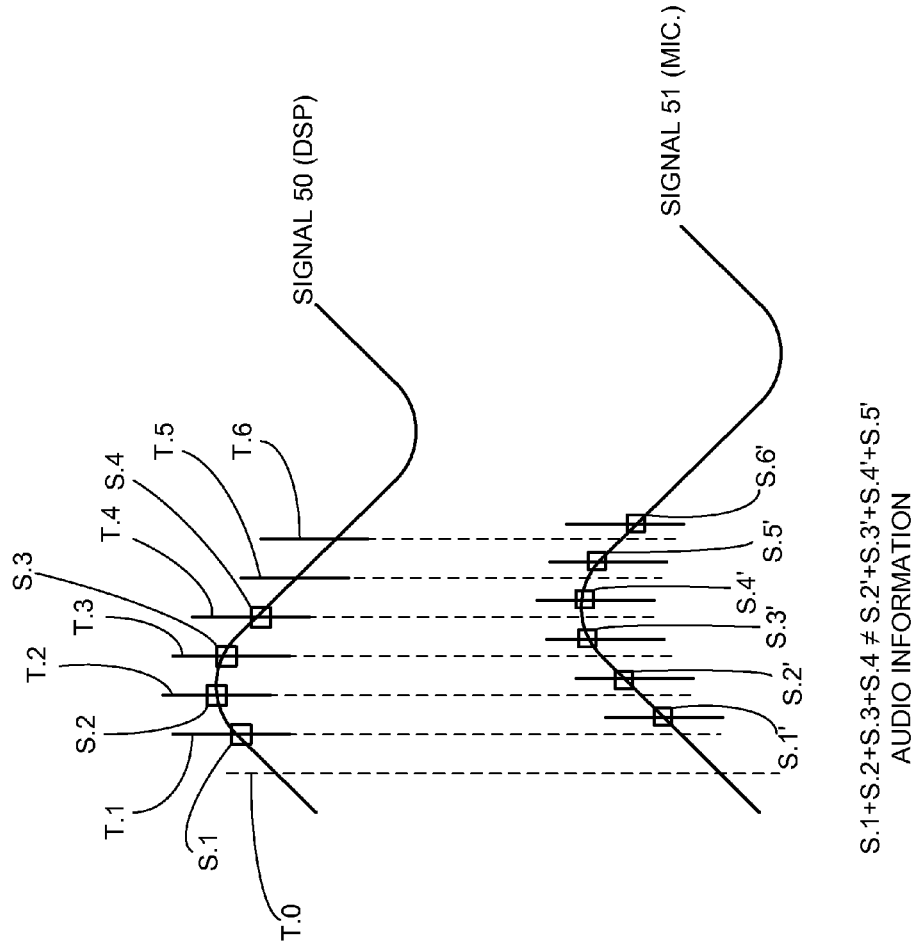
FIG. 6 is an illustration of a waveform sampled at a DSP and wireless microphone with unsynchronized clocks.

As illustrated in FIG. 6, if the clocks used to control the signal sampling at a DSP located in a base station (F.P.) and at the wireless microphones (M.P.) are not synchronized to a common, master reference clock, then the audio information captured in samples at the DSP and microphones can be different resulting in the AEC not removing the acoustic echo or removing as much of the acoustic echo component in the microphone signal than is possible using the method of this invention. Specifically, FIG. 6 shows that the time at which each of the samples are captured from signal 51 is offset in time (captured later in time) from the time at which each of the samples are captured from signal 50. In this case, when the samples captured from signal 50 are aligned with the samples in signal 51 (similarly to the alignment described earlier with reference to FIG. 5 . . . sample S.1 aligned to sample S.2' and so forth) the audio information in the signal 50 samples will not be the same as the audio information in the signal 51 samples. This misalignment of the audio information will prevent the AEC 42 from removing some or all of the acoustic echo in the local microphone signal.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A base station comprising a wireless, digital audio conferencing system operates to derive a local clock from a master clock signal generated by an external network to which it is connected, a method comprising:
   receiving the master clock signal at the base station, the master clock signal having a first clock rate;
   deriving the local clock by the base station modifying the first clock rate of the master clock signal to be a second clock rate, the second clock rate being different than the first clock rate; and
   using the second clock rate to control the operation of the base station to capture and process multimedia information.

2. The method of claim 1, wherein the base station runs a multimedia processing application that is one of an audio conference application or a video conference application.

3. The method of claim 2, wherein the audio conference application is comprised of functionality for capturing acoustic audio information and removing acoustic echo from the captured audio information.

4. The method of claim 1, wherein the multimedia information is comprised of one or both of audio and video information.

5. The method of claim 1, wherein the second clock rate is derived by dividing the first clock rate comprising the master clock signal.

\* \* \* \* \*